Oct. 15, 1929.　　　E. M. BROGDEN　　　1,732,118
PRESERVATIVE TREATMENT OF FRESH FRUIT
Filed March 2, 1925
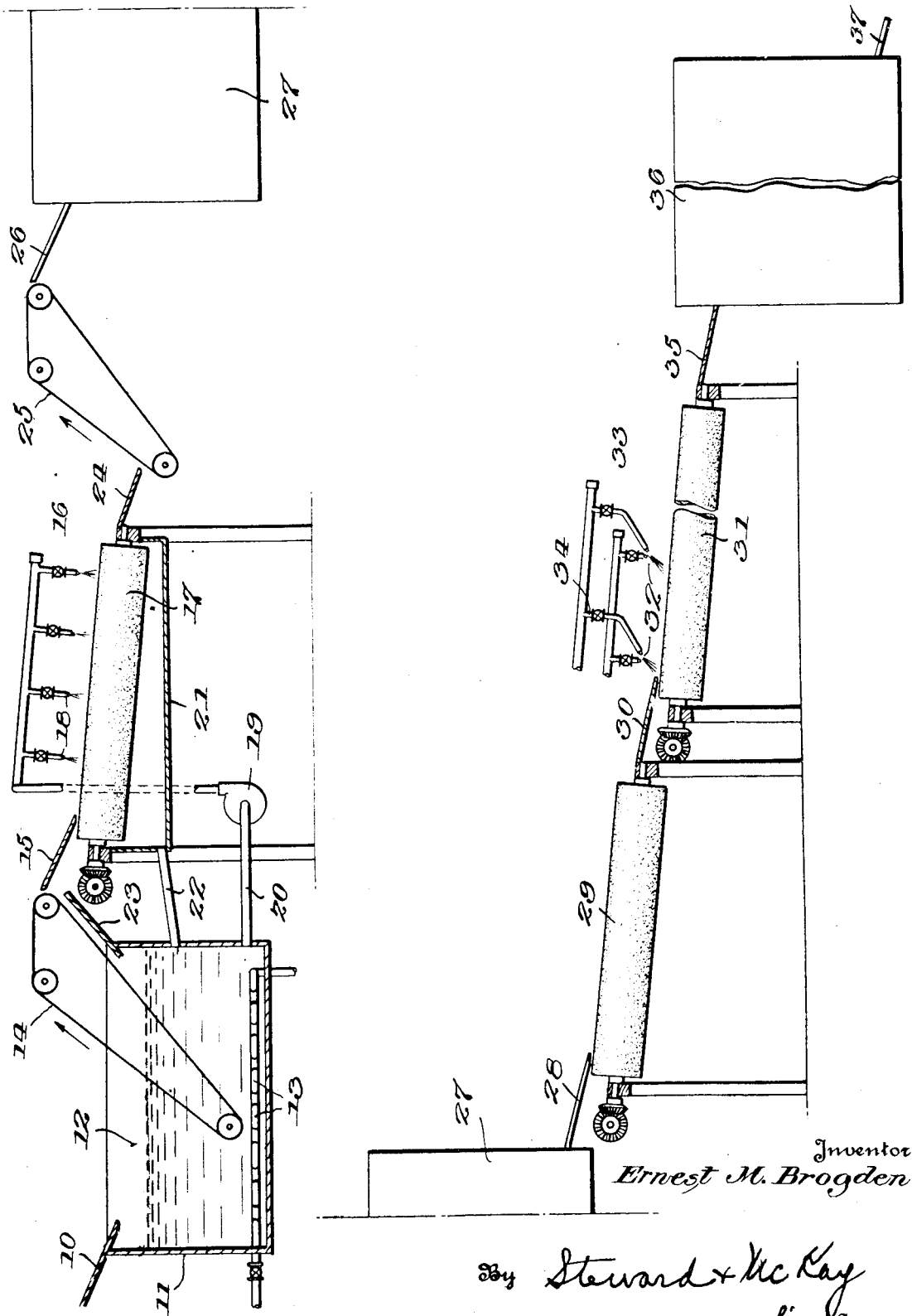
Inventor
Ernest M. Brogden,
By Steward + McKay
his Attorneys Patented Oct. 15, 1929

1,732,118

UNITED STATES PATENT OFFICE

ERNEST M. BROGDEN, OF SANTA MONICA, CALIFORNIA, ASSIGNOR TO BROGDEX COMPANY, OF WINTER HAVEN, FLORIDA, A CORPORATION OF FLORIDA

PRESERVATIVE TREATMENT OF FRESH FRUIT

Application filed March 2, 1925. Serial No. 12,775.

This invention relates to preservative treatment of fresh fruit; and it relates more particularly to a process of treating fresh citrus and other fruits with a solution of a suitable mold-inhibiting agent of such character, strength, and concentration, as to exert an effective mold-inhibiting action on the fruit that is lasting or permanent in the sense that the fruit is afforded protection from mold and decay-producing organisms for a period sufficiently long to ensure its reaching the ultimate consumer in good condition even when shipped without pre-cooling and refrigerating.

The greatest present utility of the invention is in the treatment of citrus fruits such as oranges, grapefruit, lemons, and tangerines. Apples and other fruits can also be effectively treated by the process. The invention is broad, however, and the term fruit as herein employed is to be understood as including not only fruit ordinarily so-called but also vegetables, such as tomatoes or the like that can be treated to advantage in accordance with the principles of the invention as hereinafter set forth. For the sake of a concrete explanatory example, however, reference will be made hereinafter more particularly to the treatment of fresh citrus fruit, especially oranges and lemons, for protection against attack and destruction by what is commonly known as "blue-mold" which, as is well known in the art, is responsible for the greater part of decay losses experienced by growers, shippers, and distributers of oranges and other citrus fruits.

It has been established that blue mold spores and similar decay-producing organisms enter and attack fruit almost wholly by way of rind or skin tissues exposed as a result of mechanical injury of some kind. Sound fruit absolutely free from mechanical injury is not ordinarily suscepticle to attack by blue mold. In the usual course of growing fruit, picking it, and transporting it to the packing house in field boxes or crates, a substanatial percentage of the fruit is unavoidably injured in one way or another notwithstanding that in the best practice constant effort is made to prevent this. As a result, a considerable proportion of fruit arriving at the packing house carries bruises, scratches, thorn-pricks or punctures, insect stings, clipper-cuts, and other surface injuries by which the rind tissues are exposed to a greater or lesser extent. Some of these injuries are often so small as hardly to be discernible, but even the smallest affords ample opportunity for mold spores to enter the rind tissues and develop therein to the ultimate great damage or destruction of the fruit. In the case of injuries received by the fruit while still on the tree and before picking, more or less complete drying out of the exposed tissues may occur before mold spores happen to gain access to the wound, and in such cases the spores gaining access may not develop because of the relatively unfavorable medium afforded by thoroughly dried out tissues. However, such dried out tissues tend to absorb rapidly any liquid with which they may come in contact, and if this liquid happens to be ordinary water, for example, the tissues may thus be rendered again a favorable medium for development of mold spores. After the fruit is picked, a period of at least 24 to 48 hours commonly elapses before it actually passes through the packing house operations, during which period surface or rind tissues more recently exposed, as by mechanical injuries received in picking and hauling fruit to the packing house, also have an opportunity to dry out to a considerable extent and thus become absorptive. Rind tissues exposed as a result of either old or recent injuries are therefore largely or considerably dried out as a rule by the time the fruit is actually put through the packing house operations and are therefore ready to absorb or drink up with avidity any liquid with which they come into contact. Therefore, when the fruit is initially soaked in ordinary wash water and rubbed or scrubbed therewith, as is customary in the standard packing house practice prevailing prior to this invention, the exposed rind tissues of the fruit take up the wash water and become saturated therewith rather quickly. As the wash water is almost certain to contain large quantities of blue-mold spores or the like, these readily enter and inoculate said tissues at the very outset. Therefore, washing the fruit in accordance with such prior practice has been an effective means of inoculating fruit with blue mold spores and the like with consequent heavy loss from decay in fruit shipments.

The present applicant has discovered that by the application of a suitable mold-inhibiting agent to fresh citrus or other fruit under proper conditions it is possible to greatly reduce and in many cases to practically eliminate decay from blue mold and the like. In successfully practicing the invention, however, it is important to observe certain conditions rather strictly. In the first place, it is essential that the mold-inhibiting agent employed enter or penetrate into the exposed rind tissues in such quantity that the growth or development of any blue mold spores then present shall be stopped or prevented from getting a start, and also that said tissues shall be rendered unfavorable as a medium of development not only for any spores already present but also for spores that may and almost inevitably will subsequently gain access thereto during the packing operations or during shipping and distribution. Furthermore, the treatment of the fruit in accordance with the invention should be such that the inhibiting action of the agent employed is substantially permanent, that is, effective for a period of time ample to cover the reasonable commercial life of the fruit, in order that it may reach the consumer in sound edible condition.

In order to achieve these results in actual practice, it is essential first that the treating solution applied to the fruit be of adequate strength or concentration. By this is here meant that, in employing mold-inhibiting agents such as those herein contemplated, the treating solution should contain not less than two ounces of the mold-inhibiting agent per gallon of water employed in making up the solution. Usually even higher concentrations are desirable. The mold-inhibiting agents employed in practicing the invention are without injurious action upon the fruit under the conditions of use and are also without harmful effect upon human beings even in the maximum quantity possible for the fruit to carry when treated in accordance with the invention. Ordinarily best results are obtained by applying the treating solution warm, somewhat above 100° F. but not so hot as to scald or cook the fruit. Temperatures ranging from 110° to 120° F., with a working average of 115° F., are suitable in most cases.

In the next place, the fruit to be put through the packing house operations should most desirably be brought into contact with the solution of mold-inhibiting agent initially without undergoing previous washing with water. In other words, the tissues exposed by surface injuries to the fruit should not be given an opportunity previously to absorb water and become saturated to such an extent as would cause it to fail to readily take up the mold-inhibiting solution. Where the tissues have previously been saturated with ordinary wash water, such small amount of treating solution as may diffuse into said tissues is often likely to be in such diluted condition as to be ineffective, or substantially so, in stopping development of blue mold spores; or at best such protection as is afforded is apt to be less permanent than is desirable.

Therefore, the process of the present invention comprises, in its best practical embodiments, initially contacting the previously unwashed fruit with a solution of a mold-inhibiting agent in effective concentration before the fruit has come into substantial contact with any other liquid. Under these circumstances the dried-out or partially dried-out exposed rind tissues eagerly absorb said solution, with the result that a sufficiently large amount of the mold-inhibiting agent enters said tissues to render substantially permanently inactive blue mold spores or the like that may already be present, and also to render the exposed tissues substantially permanently unfavorable to development of blue mold spores whether already in or subsequently gaining access to said tissues. If the fruit thus initially wetted with the mold-inhibiting solution be so dirty as to require a thorough cleansing treatment, it can be rubbed or scrubbed with the mold-inhibiting solution. In fact this rubbing or scrubbing is advantageous in that it further promotes effective entry or penetration of the mold-inhibiting agent into the exposed rind tissues.

Several mold-inhibiting agents are available for use within the scope of the invention provided that care be taken to employ them in sufficiently strong or concentrated solution and under proper operating conditions. For example, a strong solution of a soluble hypochlorite, more particularly a hypochlorite of an alkali-metal or an alkaline earth metal is effective to reduce blue mold decay substantially. Furthermore, the permanency of the protective effect attained by the use of such a solution is materially enhanced if the solution be so constituted as to possess a considerable excess of alkalinity over and above that due to its content of hypochlorite alone. Borax may be mentioned as an example of another mold-inhibiting agent that can be used very effectively in the practice of the invention, and the employment of borax is to be understood as included within the scope of the broad claims hereunto appended. Sodium carbonate may also be used, either alone or with special advantage in conjunction with sodium hypochlorite or with borax. Besides possessing mold-inhibiting properties when in proper concentration, sodium carbonate has an excellent detergent action and is therefore of particularly great utility for the purposes of the invention in cases where the fruit to be treated carries oily soot or smudge that is difficult to remove completely from the fruit in cleansing the same.

After treatment of the fruit with the mold-inhibiting solution which, as already pointed out, may desirably include a thorough rubbing or brushing of the fruit while wet with such solution, the surface of the fruit is freed from surface moisture before it passes through the later steps of grading, sizing, and packing in shipping crates or boxes. This removal of surface moisture may be carried out in suitable drying apparatus of which various types are available in the art; and if the fruit is still wet with the drying solution when it enters the drier, the evaporation of the surface moisture as the fruit passes through the drier is so gradual that the wetting contact of the drying solution with the fruit is thereby substantially prolonged and additional opportunity is afforded for thorough and complete impregnation of the exposed rind tissues with the mold-inhibiting agent. Where a treating solution is used that contains more than say three or four ounces of mold-inhibiting agent per gallon, the fruit upon drying is apt to show on its surface a noticeable whitish deposit of said agent. This does no actual harm but on the contrary may be beneficial from the standpoint of further ensuring permanency in the protective effect afforded by the treatment. But, on the other hand, the trade is apt to object to the appearance of fruit carrying such a surface deposit, and consequently it is often advisable in practicing the invention to subject the fruit to treatment, either before or after drying, to remove such of the surface excess of mold-inhibiting agent as is unnecessary and unsightly while at the same time carefully avoiding removal of so much as might destroy or seriously diminish the resistance of the treated fruit to attack by blue-mold or other decay-producing organisms.

After treatment of the fruit as described above, the fruit may advantageously be subjected to further treatment for the purpose of providing it with a very thin film-like protective coating of waxy material effective to prevent withering or shrinking of the fruit, and to maintain it in plump firm condition. To this end the fruit, after removal of its surface moisture, may receive an application of a very small amount of waxy material which is then thoroughly rubbed all over the surface of the fruit to produce a continuous protective film-coating of the desired extreme thinness. In a typical instance the waxy material employed may be ordinary paraffin wax, and for convenience in applying the same and securing a final coating of the desired character, the paraffin wax may be employed in mixture with a suitable solvent which may be, for example, a suitable petroleum distillate such as a highly refined kerosene. In practice this mixture may comprise from 5 to 20 per cent of paraffin, and an especially satisfactory mixture is one containing 17.5 per cent of paraffin wax. When slightly warmed this mixture is highly fluid and can be sprayed or atomized upon the fruit in minute quantity accurately adjustable to produce exactly the desired result. It is to be understood that this treatment of the fruit with a waxy protective material is not essential to the new process in the broader aspect of the invention but is a highly desirable feature thereof in many instances. Where this treatment is employed, it is especially desirable, in order that the treated fruit may present the best appearance, that substantially all unnecessary superficial excess of the mold-inhibiting agent be previously removed from the fruit since otherwise the solid-inhibiting agent in mixture with the small quantity of paraffin wax applied to the fruit sometimes gives the fruit a specked or grayish appearance that may be objected to by the trade.

As hereinabove stated, the invention in its broader aspects is not restricted to the use of any one specific mold-inhibiting agent. More detailed reference will now be made to conditions for using several particularly suitable agents as typical of those giving satisfactory results in practice.

Hypochlorites of alkaline-earth metals and alkali-metals, especially when employed in concentrations ranging say, from 3 to 6 ounces per gallon of water, are effective to reduce blue mold decay substantially. For example, according to one method of preparing an effective alkaline hypochlorite solution, commercial chlorinated lime (bleaching powder or chlorid of lime) containing about 30 per cent of available chlorine is mixed with water in the proportion of one pound of chlorinated lime to ½ gallon of water, the mixture being thoroughly agitated until smooth. To such a mixture is then added an equal volume of a solution of sodium carbonate prepared by dissolving soda-ash in water in the proportion of 10 ounces of soda-ash to ½ gallon of water. The resultant mixture should be thoroughly agitated and allowed to stand until the precipitate of calcium carbonate settles out, after which the clear solution can be decanted. This constitutes a stock solution of sodium hypochlorite containing usually in the neighborhood of from 8 to 10 ounces of sodium hypochlorite per gallon. This is stronger than is usually necessary or desirable to use in treating fruit, but by diluting the stock solution with from 1 to 3 volumes of water, solutions containing down to about 2 ounces of sodium hypochlorite per gallon are readily made up. Solutions containing around 4 to 6 ounces of sodium hypochlorite per gallon are especially to be recommended. Fruit treated with such solutions, especially when maintained slightly warm, shows substantial resistance to blue mold and blue mold spores, and its life is materially prolonged. The fruit should remain in contact with the treating solution for several minutes, usually at least two or three minutes, in order to attain satisfactory results, and a treating period of five minutes or more is usually advisable. In this connection it is to be understood that neither a hypochlorite solution, nor any other treating solution, can ordinarily prevent decay of fruit that has already become infected with blue mold to such an extent that the infection has extended clear through the rind tissues into the pulp or juicy portion of the fruit, a condition sometimes characterizing an occasional fruit in a lot delivered to the packing house.

An alkaline hypochlorite solution is even more effective when its degree of alkalinity is substantially in excess of that attributable to its content of sodium hypochlorite alone. Such excess alkalinity may be obtained by employing, in addition to the quantity of soda-ash above specified, a substantial further quantity which may be conveniently added either to the stock solution or to the diluted solutions mentioned. This further addition of soda-ash may vary considerably in practice but may be equivalent in typical instances to from 5 to 20 ounces of soda-ash to each gallon of the stock solution prepared as above described. A sodium hypochlorite solution possessing substantial excess alkalinity is found to be more effective than a simple solution of sodium hypochlorite in that its protective or inhibiting action against blue mold and other decay-producing organisms is apt to be more permanent or lasting. Furthermore, the greater cleansing power of the solution is an advantage.

Instead of using a sodium hypochlorite solution, it is feasible to use a solution of chlorid of lime prepared by mixing commercial chlorinated lime with water in the proper proportions and allowing the undissolved matter to settle out, then decanting the clear solution.

As already stated, another mold-inhibiting agent that may be used within the broad scope of the invention is ordinary borax which proves effective when employed in solutions containing at least two ounces to the gallon, and more desirably five to ten ounces per gallon.

Sodium carbonate alone, employed, in the form of soda-ash in concentrations of two ounces per gallon and upwards, can be used to reduce blue mold decay, and aqueous solutions containing five to eight ounces per gallon are especially effective in their mold-inhibiting action besides serving as an excellent cleansing medium for removing from the surface of the fruit foreign matter of an oily nature, such as smoke or smudge deposits from oil heaters used in warming the groves in frosty weather. Sodium carbonate can also be used to great advantage in association with some other mold-inhibiting agent, especially when the latter is not as effective a detergent as may be desirable in a given instance. Thus a solution containing from four to eight ounces each of soda-ash and borax gives very satisfactory results both in practically eliminating blue-mold decay and also in thoroughly cleansing the fruit. As a rule it is not desirable to employ soda-ash in quantity exceeding say ten or twelve ounces per gallon since in too great concentration it may adversely affect the appearance of the rind of the fruit.

While the process of the invention may be carried out with the aid of various types of apparatus, one desirable practical form of apparatus installation that gives satisfactory results in treating oranges, for example, is shown more or less schematically and diagrammatically in side elevation in the accompanying drawings. In using this apparatus to carry out the new process in one of its desirable practical embodiments, fruit in the condition in which it is received from the grower and without previous washing is delivered over chute board 10 into soaking tank 11 which contains a strong water solution of a mold-inhibiting agent of the character hereinabove set forth, the level of the liquid in the soaking tank being indicated at 12. It may be assumed in this instance that the solution in the soaking tank is a 3 to 5 per cent solution of sodium hypochlorite possessing excess alkalinity equivalent to an addition of at least one ounce of sodium carbonate to each gallon of the treating solution. The treating solution in the soaking tank may be warmed to somewhat above 100° F. by a suitable heating means such as steam coils 13, the temperature of the solution being insufficiently high to scald or cook the fruit, however, and also insufficiently high to promote excessive decomposition of the sodium-hypochlorite. The oranges or other fruit dumped into the soaking tank 11 float gradually towards the other end of the tank where an elevator of any suitable type, conventionally indicated at 14, removes the fruit from the body of treating solution. The fruit is thoroughly wetted with the treating solution as it travels through the soaking tank and, since this is the initial treatment given the fruit in the packing house operations, the dried-out or partially-dried out exposed rind tissues take up the treating solution efficiently and become practically saturated therewith. The aforesaid elevator conducts the wet fruit up out of the tank and delivers it over chute board 15 to a fruit washer 16 which may be of any usual or other suitable type. In the present instance, said fruit washer is of a cylindrical brush roll type well known in the art, one of the brush rolls being indicated at 17. As the fruit passes down along the brush rolls, which may be gently inclined toward the delivery end as shown, it is sprayed with treating solution supplied through overhead spray jets 18 by a pump 19 which draws its supply through pipe 20 from the soaking tank 11. The excess solution falls from the brush rolls of the fruit washer into a drip pan 21 and is returned through pipe 22 to the soaking tank. A drip board 23 is also provided to return drip from the elevator 14 to said tank. This circulation and repeated use of the solution is desirable not only because it effects economy in the amount of treating solution used and heat units expended, but also because it helps to maintain uniformity in the concentration of the solution.

After receiving a thorough rubbing and scrubbing in the washer 16, the cleansed and treated fruit is discharged over chute board 24 to suitable conveyor means such as elevator 25 which delivers it over chute board 26 to a fruit drier of any well known or suitable type indicated conventionally at 27. In this drier, the greater part of the surface moisture is gradually evaporated from the fruit, although it is not essential to success of the process that this drying be perfectly complete. Where the treating solution is fairly strong, however, it is desirable from the standpoint of the final appearance of the fruit, that sufficient drying occur to enable ready removal of the superficial excess of the mold retarding agent by the subsequent rubbing treatment. From the drier, the fruit passes over chute board 28 to suitable brushing and rubbing means which may desirably be of the brush roll type indicated generally at 29. While this apparatus may be a brush roll polisher such as is common in the art, better results are obtainable by the use of a novel form disclosed and claimed in the application of E. M. Brogden, Ser. No. 653,227, filed July 23, 1923. In apparatus 29, the fruit is thoroughly rubbed by the brushing surfaces of the rolls which are advantageously of horsehair and are desirably driven at relatively high speed, the white powdery deposit of borax left on the surface of the fruit after drying being dusted off by these rolls. The mechanism should be of such character and design as to ensure turning the fruit on various axes so that all portions of its surface may be subjected to effective brushing and rubbing.

From the brush roll mechanism 29, the fruit rolls down over chute board 30 to another brush roll mechanism indicated generally at 31 above which near the upper or receiving end is located suitable spraying means such as air brushes indicated conventionally at 32, said air brushes serving to direct fluid coating material in atomized condition down upon the fruit as it enters the unit 31. Most desirably this coating material comprises paraffin and a solvent thereof thoroughly intermingled to provide a thinly fluid mixture that can be spread in an extremely thin film over the fruit by the action of the brush rolls. Both the liquid supply jet pipes 33 and the cooperating compressed air jets 34, which comprise the air brush devices, are suitably valved, as shown, so that the proper quantity of coating material projected upon the fruit entering unit 31 can be accurately adjusted to the optimum amount. An especially desirable solvent for use in the waxy coating material or composition before mentioned is a refined light mineral oil of the kerosene type which may be obtained in the distillation of petroleum. In a typiical instance, this distillate may have a specific gravity of about 0.810, a flash point of about 149° F., and an approximate boiling range of 360° to 486° F. The waxy material employed may desirably constitute from 5 to 20 per cent of the composition.

Another satisfactory coating mixture of suitable fluent character may consist of 1 part of paraffin wax, and 2 parts of a highly refined low viscosity white mineral oil, which is odorless, tasteless and colorless. Such an oil may, for example, be of about 0.840 specific graivty, and have a viscosity of 70–73 seconds at 100° F., a flash point of 340°–350° F., and a boiling range approximating 600° to 745° F. The wax-containing mixtures or compositions hereinabove disclosed are not claimed herein, the same constituting the subject matter of prior copending applications of one of the present applicants.

After receiving a small amount of coating material from the air brushes upon entering brush roll unit 31, the fruit continues to pass down the brush roll runway or runways and is subjected to a very thorough rubbing by the horsehair surfaces of the brush rolls which are rotated at sufficiently high speed to ensure spreading out the small quantity of coating material applied to each fruit into a protective film coating of microscopic thinness. The brush rolls of unit 31 may advantageously be quite long in order that, after receiving the initial application of coating material by the air brushes at the receiving end, the fruit then travels a comparatively long distance in contact with the rapidly moving brushing surfaces, whereby the brushing action is thoroughly effective to produce a protective coating of the desired extreme thinness.

After leaving unit 31, the fruit passes over chute board 35 and travels through fruit drier 36, where it is subjected to currents of air, most desirably suitably warmed. This treatment results in the evaporation of residual moisture upon the surface of the fruit and also of at least a part of the hydrocarbon solvent, if a volatile solvent was employed in the waxy coating composition.

Leaving the drier over chute board 37, the fruit then goes to the graders and sizers and is ready to be shipped in the usual manner with the exception, however, that pre-cooling and refrigeration are not necessary, provided the cars in which the fruit is shipped are reasonably well ventilated.

While, in the specific example hereinabove given, removal of superficial excess of mold-inhibiting agent from the surface of the fruit is accomplished by brushing the fruit after it has gone through the drier, the invention in its broader aspects is not to be understood as restricted to such a procedure. For example, it is possible to effect such removal in a satisfactory manner by very lightly rinsing the fruit with plain water or with a very weak solution of the mold-inhibiting agent, after it leaves the brush rolls and before it enters the drier. This rinsing must be conducted carefully and the quantity of rinsing liquid should be regulated to avoid removal of so much of the mold-inhibiting agent as would substantially diminish or destroy the resistance of the fruit to blue mold decay.

It is to be understood that in the practice of the invention the solution of mold-inhibiting agent employed in each case should be of such fluidity, strength and temperature, and the duration of the treatment should be such, that exposed rind or skin tissues are effectively impregnated with said agent and rendered resistant to blue mold decay, while at the same time the freshness and edibility of the fruit are not substantially impaired.

In the foregoing disclosure of the principles of the invention, reference has been made more particularly to blue mold as a source or cause of decay. Such reference to blue mold is to be taken, not as restrictive, but as generic and as intended, both in the specification and in the claims, to cover not only blue mold but all kindred rot and decay organisms and diseases generally amenable to treatment in accordance with the invention, to which fruit is or may be susceptible and by which it may be damaged under the conditions prevailing in packing and marketing.

What is claimed is:

1. In the preparation of fresh citrus fruit for market, the process of controlling blue-mold decay or the like which includes the steps of soaking unwashed citrus fruit as it comes from the grove in a body of wash water containing dissolved therein an effective percentage of a mold-inhibiting agent, then removing the fruit from said body of wash water and rubbing it while wet with said wash water.

2. In the preparation of fresh fruit for market, the process of controlling blue-mold decay or the like which comprises first soaking the fruit for several minutes with a water solution of a mold-inhibiting agent in mold-inhibiting concentration, and then rubbing the fruit with such solution whereby to ensure intimate wetting contact of the solution with the entire surface of the fruit.

3. In the preparation of fresh citrus fruit for market, the process of controlling blue-mold decay or the like which comprises advancing the fresh fruit in a traveling stream over a predetermined path, maintaining the fruit wet with a warm solution of a mold-inhibiting agent for a period of at least two minutes during such travel, and further treating the fruit at subsequent stages in its travel to effect removal of surface moisture and surface excess of mold-inhibiting agent therefrom, while avoiding removal of so much as would destroy resistance of the fruit to blue-mold decay.

4. In the preparation of fresh citrus fruit for market, the process of controlling blue-mold decay or the like which includes the steps of soaking unwashed fresh citrus fruit as it comes from the grove in a body of wash water containing dissolved therein an effective percentage of a mold-inhibiting agent, then removing the fruit from said body of wash water and rubbing it thoroughly while showering upon it more of such wash water.

5. In the preparation of fresh citrus fruit for market, the process of controlling blue-mold decay or the like as set forth in claim 4, further characterized by the fact that an alkaline hypochlorite is employed as the mold-inhibiting agent.

6. In the preparation of fresh fruit for market, the process of controlling blue-mold decay or the like which comprises contacting the entire surface of fresh fruit with a solution of a solid mold-inhibiting agent of sufficient concentration to leave a noticeable deposit on the surface of the fruit if allowed to dry, removing so much of the excess of mold-inhibiting agent as would render the appearance of the fruit uncommercial while avoiding removal of so much as to destroy the resistance of the fruit to blue mold decay, and then applying to the fruit a thin film-like protective coating comprising wax material.

7. In the preparation of fresh fruit for market, the process of controlling blue-mold decay or the like which comprises subjecting fresh fruit to the action of an aqueous solution of an alkali-metal hypochlorite possessing a degree of alkalinity greater than that due to the content of hypochlorite alone, the fluidity, strength and temperature of the treating solution, and the duration of the treatment, being such that exposed rind or skin tissues of the fruit are effectively impregnated with said hypochlorite and rendered resistant to blue mold decay, while at the same time the fruit is not scalded nor is its freshness or edibility otherwise substantially impaired.

8. In the preparation of fresh fruit for market, the process of controlling blue-mold decay or the like which comprises subjecting fresh fruit to the action of an aqueous solution containing not less than 2 ounces of sodium hypochlorite per gallon until exposed rind tissues of the fruit are effectively impregnated therewith, said solution containing an added alkaline reagent in such quantity that the solution possesses a degree of alkalinity in excess of that due to said sodium hypochlorite equivalent to an addition of at least one ounce of sodium carbonate per gallon.

9. In the preparation of fresh fruit for market, the process of controlling blue-mold decay or the like which includes the step of thoroughly rubbing the surface of the fresh fruit while wet with a solution of a mold-inhibiting agent in mold-inhibiting concentration.

In testimony whereof I hereunto affix my signature.

ERNEST M. BROGDEN.